US012784442B2

(12) United States Patent

Wang et al.

(10) Patent No.: US 12,784,442 B2
(45) Date of Patent: Nov. 3, 2026

(54) ROOF SEGMENT IDENTIFICATION FOR SOLAR PROJECT DESIGN

(71) Applicant: Inventus Holdings, LLC, Juno Beach, FL (US)

(72) Inventors: Chen Wang, Jupiter, FL (US); Dane M Mckoy, Coral Springs, FL (US); Ty J Brockhoeft, Austin, TX (US)

(73) Assignee: Inventus Holdings, LLC, Juno Beach, FL (US)

( * ) Notice: Subject to any disclaimer, the term of this patent is extended or adjusted under 35 U.S.C. 154(b) by 191 days.

(21) Appl. No.: 18/910,936

(22) Filed: Oct. 9, 2024

(65) Prior Publication Data

US 2026/0100034 A1 Apr. 9, 2026

(51) Int. Cl.
*G06K 9/00* (2022.01)
*G06V 10/26* (2022.01)
(Continued)

(52) U.S. Cl.
CPC ............ *G06V 20/176* (2022.01); *G06V 10/26* (2022.01); *G06V 10/454* (2022.01); *G06V 10/72* (2022.01);
(Continued)

(58) Field of Classification Search
CPC ...... G06V 20/176; G06V 10/82; G06V 20/17; G06V 10/764; G06V 10/26; G06V 10/44; G06V 10/451; G06V 20/64; G06V 10/774; G06V 20/647; G06V 20/00; G06V 2201/10; G06V 10/454; G06V 20/13;
(Continued)

(56) References Cited

U.S. PATENT DOCUMENTS 9,070,018 B1 6/2015 Ciarcia et al.
9,384,398 B2 7/2016 Chen et al.
(Continued)

FOREIGN PATENT DOCUMENTS

WO 2023057505 4/2023

OTHER PUBLICATIONS

AI Superior. (Jun. 1, 2023). AI Superior Projects deliver value. Ai Superior. https://web.archive.org/web/20230721055328/https://aisuperior.com/projects/.
(Continued)

*Primary Examiner* — Alex Kok S Liew
(74) *Attorney, Agent, or Firm* — Troutman Pepper Locke LLP; Dustin B. Weeks

(57) ABSTRACT

In several aspects, an image of a roof, an elevational image of the roof, and a mask image of the roof are accessed. Next, the mask image is applied to the elevational image of the roof to create a set of coordinate points that denote the portion of the roof. Using a machine learning model, a set of roof segment contours is created for each roof segment in the set of coordinate points that denote the portion of the roof. An iterative loop is performed, in which each roof segment contour in the set of roof segment contours on the roof ridges and the non-roof edges identified. A polygon shape is matched and associated with each roof segment, based on the roof ridges and the non-roof edges identified. Using a GUI, each polygon shape is automatically overlaid on the respective associated roof segment in the image of the roof.

17 Claims, 14 Drawing Sheets

100

200

(51) Int. Cl.

| | |
|---|---|
| ***G06V 10/44*** | (2022.01) |
| ***G06V 10/72*** | (2022.01) |
| ***G06V 10/75*** | (2022.01) |
| ***G06V 10/764*** | (2022.01) |
| ***G06V 10/766*** | (2022.01) |
| ***G06V 10/774*** | (2022.01) |
| ***G06V 10/776*** | (2022.01) |
| ***G06V 20/10*** | (2022.01) |
| ***G06V 20/70*** | (2022.01) |

(52) U.S. Cl.

CPC ........ *G06V 10/7553* (2022.01); *G06V 10/764* (2022.01); *G06V 10/766* (2022.01); *G06V 10/774* (2022.01); *G06V 10/776* (2022.01); *G06V 20/70* (2022.01)

(58) Field of Classification Search

CPC .... G06V 10/7715; G06V 10/25; G06V 20/10; G06V 20/52; G06V 30/19173; G06V 10/993; G06V 20/70; G06V 2201/12; G06V 30/19013; G06V 30/19107; G06V 30/347; G06V 30/414; G06V 30/422; G06V 10/247; G06V 10/273; G06V 10/34; G06V 10/40; G06T 2207/10032; G06T 2207/20084; G06T 7/11; G06T 2207/20081; G06T 2207/30184; G06T 7/12; G06T 7/60; G06T 17/00; G06T 2207/10028; G06T 17/20; G06T 7/70; G06T 17/05; G06T 7/10; G06T 7/0004; G06T 7/13

See application file for complete search history.

(56) References Cited

U.S. PATENT DOCUMENTS

| | | | | |
|---|---|---|---|---|
| 9,582,932 | B2 | 2/2017 | van der Merwe et al. | |
| 9,911,228 | B2 | 3/2018 | Pershing et al. | |
| 10,133,829 | B2 | 11/2018 | Chen et al. | |
| 10,853,931 | B2 | 12/2020 | Marra et al. | |
| 11,030,355 | B2 | 6/2021 | Pershing | |
| 11,151,378 | B2 | 10/2021 | Kottenstette et al. | |
| 11,308,714 | B1 | 4/2022 | Christoudias et al. | |
| 11,392,730 | B2 | 7/2022 | Daouk et al. | |
| 11,481,998 | B2 | 10/2022 | Lin et al. | |
| 11,494,978 | B2 | 11/2022 | Esteban et al. | |
| 11,544,900 | B2 | 1/2023 | Lin et al. | |
| 11,651,511 | B2 | 5/2023 | Justus et al. | |
| 11,776,104 | B2 | 10/2023 | Strong | |
| 11,830,137 | B2 | 11/2023 | Stevens et al. | |
| 11,995,886 | B2 | 5/2024 | Raskob et al. | |
| 2015/0363645 | A1* | 12/2015 | Chen .................... | G06V 20/176 382/173 |
| 2017/0076438 | A1* | 3/2017 | Kottenstette ........ | G06F 18/2413 |
| 2021/0272358 | A1* | 9/2021 | Stevens .................. | G06N 3/045 |
| 2022/0180016 | A1 | 6/2022 | Jenks et al. | |
| 2024/0135690 | A1 | 4/2024 | Shabtay et al. | |

OTHER PUBLICATIONS

Aslani, M., & Seipel, S. (2021). Automatic identification of utilizable rooftop areas in digital surface models for photovoltaics potential assessment. Applied Energy, 306, 118033. https://doi.org/10.1016/j.apenergy.2021.118033.

Blunden, L. S., Mahdy, M. Y., Alghamdi, A. S., & Bahaj, A. S. (2021). Satellite imagery to select a sample of rooftops for a PV installation project in Jeddah, Saudi Arabia. Journal of Physics Conference Series, 2042(1), 012014. https://doi.org/10.1088/1742-6596/2042/1/012014.

Lee, S., Iyengar, S., Feng, M., Shenoy, P., & Maji, S. (2019). DeepRoof. University of Massachusetts. https://doi.org/10.1145/3292500.3330741.

Wang, Y., Li, S., Teng, F., Lin, Y., Wang, M., & Cai, H. (2022). Improved Mask R-CNN for Rural Building Roof Type Recognition from UAV High-Resolution Images: A Case Study in Hunan Province, China. Remote Sensing, 14(2), 265. https://doi.org/10.3390/rs14020265.

* cited by examiner

100

200

300

ROOF SEGMENT IDENTIFICATION FOR SOLAR PROJECT DESIGN

FIELD OF THE DISCLOSURE

The present disclosure generally relates to solar panel installation and, more particularly to roof top solar installation project design software.

BACKGROUND

Designing a rooftop solar project involves several critical steps to ensure efficiency, feasibility, and sustainability. The process begins with a comprehensive site assessment, which includes evaluating the roof's structural integrity, orientation, and shading patterns throughout the year. Engineers then determine the optimal size and layout of the solar array, considering factors such as the available roof space, local solar irradiance, and the building's energy consumption profile. Selecting high-quality solar panels and inverters that meet the specific energy needs and budget constraints is essential. Additionally, integrating the system with the existing electrical infrastructure requires meticulous planning to ensure safety and compliance with local regulations. Finally, the design phase must account for future maintenance and potential scalability, ensuring that the rooftop solar installation can adapt to evolving energy demands and technological advancements.

There is currently intensive competition in the field of solar project design platforms. A goal is to get to installation faster with final, install-ready solar designs from day one. Competitors are pursuing automated design functionalities. That means fewer change orders and cancellations, lower soft costs, and better profit margins at every stage of the process.

Further, solar project design platforms create a highly accurate solar design without having to visit the site, saving time and money during the quoting process.

SUMMARY OF THE INVENTION

Disclosed is an improved method and system of automatically identifying usable roof segments without human intervention. This drastically affects the efficiency of the design platform, customer experience, and thus revenue growth.

The system and computer-implemented method to identify roof segments for a rooftop solar installation begins with accessing an image of a roof, a corresponding elevational image of a selected roof, and a corresponding mask image. In this example, the mask image indicates whether a coordinate point in the image of the roof denotes a portion of the selected roof. Next, the mask image is applied to the image of the selected roof to create a set of coordinate points that denote the portion of the selected roof. Using a machine learning or computer vision model, a set of roof segment contours CS is created for each roof segment in the set of coordinate points that denote the portion of the selected roof.

An iterative loop is performed, in which each roof segment contour c is in the set of roof segment contours CS, automatically comprising the three sub-steps of a) identifying roof ridges r associated with the roof segment contour c, b) using the roof ridges r as a reference, identifying non-roof edges e associated with the roof segment contour c, and c) matching a polygon shape p to each roof segment r, based on the roof ridges r and the non-roof edges e identified.

The results are automatically displayed on a graphical user interface display as an overlay in the form of a set polygon shapes P automatically associated with each roof segment in the image of the selected roof.

In one example, the machine learning model is created by accessing a set of roof images. Next, one or more transformations are applied to each roof image, including mirroring, rotating, smoothing, or contrast reduction, to create a modified set of roof images. The modified set of roof images is split by a settable ratio into training sub-sets and testing sub-sets. An iterative loop is repeated for a plurality of user-settable iterations, i) conducting multiple-fold cross-validation to find an average general model performance metrics; and ii) tuning hyperparameter settings of a machine learning model to produce a set of accuracy measurements. The optimal hyperparameter settings for a machine learning model are identified using the average general model performance metrics. The machine learning model is trained using the optimal hyperparameter settings and the modified set of roof images as a training dataset.

In one example, the roof ridges r are identified by finding a set of roof segments adjacent $C_{adj}$ to the roof segment contour c. An iterative loop is performed for each adjacent segment contour $c_i$ in the set of roof segments adjacent $C_{adj}$. The calculation process is as follows:

- determining if the roof segment contour c and each adjacent roof segment contour $c_i$ belong to an identical selected roof;
- in response to the roof segment contour c and each adjacent roof segment contour $c_i$ belonging to an identical selected roof, using elevation data from the elevational image of the selected roof and pixel XY coordinates to build two 3D plane models for c and $c_i$, respectively;
- calculating an intersection line between the two 3D plane models;
- projecting the intersection line in 3D space to 2D space using the pixel XY coordinates to produce a resulted 2D line, in which the resulted 2D line is associated with a roof ridge;
- adding the resulted 2D line to a set of roof ridges r; and
- selecting another adjacent segment contour ci in the set of roof segments adjacent Cadj.

In the case that the roof segment contour c and each adjacent roof segment contour $c_i$ do not belong to an identical selected roof, a set of 2D coordinate points of all coordinate points on the roof segment contour c are automatically acquired. Next, a set of 2D coordinate points of all coordinate points on the adjacent segment contour $c_i$ is acquired. The 2D coordinate points in the roof segment contour are labeled as a first class. The 2D coordinate points in the adjacent segment contour are labeled as a second class. The first class and the second class are converted into a two-class classification machine learning problem with the set of 2D coordinates points. A support vector machine (SVM) model is trained using the set of 2D coordinate points and their corresponding first class or second class label information. The resulting linear decision boundary is saved as one of the roof ridges r associated with the roof segment.

Finding non-roof edges e associated with the roof segment contour c, begins with accessing the roof mask image and the roof segment contour c. Next, all non-ridge coordinate points showing the non-roof edges e of the roof segment contour c based on the corresponding mask image are identified.

The non-ridge coordinate points are converted into a set of 2D edge points E. An iterative loop is performed for each coordinate point in the 2D edge points, automatically performing each of the three sub-steps: a) applying a random sample consensus (RANSAC) regression algorithm to the set of 2D edge points E, b) appending a resulting linear component I to e, where I is a line found by this iteration, and e' indicates all edges found in this step and c) removing all inlier points associates with I from the set of 2D edge points E.

Colors may be used to identify each roof segment contour and various categories of pixel points used to identify non-ridge edge. Other features and advantages of the invention will become apparent to those skilled in the art upon review of the following detailed description, claims, and drawings.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
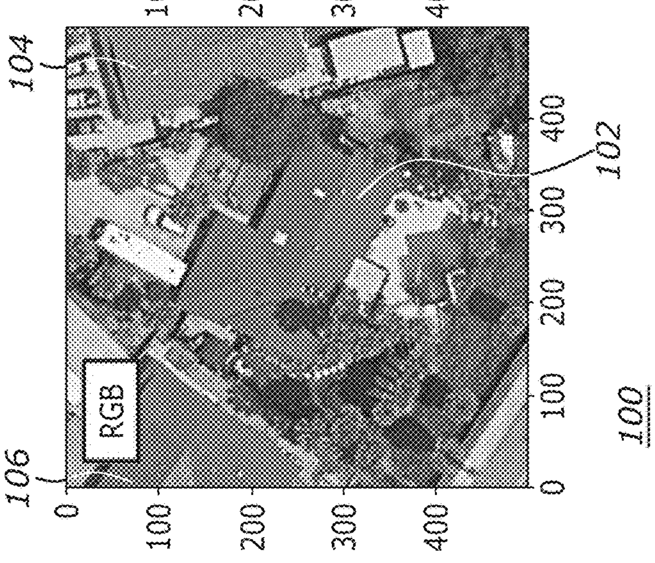
FIG. 1 illustrates an image of a roof, according to an example of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting but merely as a basis for the claims and as a representative basis for teaching one skilled in the art to variously employ the disclosed subject matter in virtually any appropriately detailed structure and function. Further, the terms and phrases used herein are not intended to be limiting but rather to provide an understandable description.

Non-Limiting Definitions

The terms "a" or "an", as used herein, are defined as one or more than one. The term plurality, as used herein, is defined as two or more than two.

The term "adapted to" describes the hardware, software, or a combination of hardware and software that is capable of, able to accommodate, to make, or that is suitable to carry out a given function.

The term "another", as used herein, is defined as at least a second or more.

The term "class" or "classifier" or "label" is a class label applied to data input in a machine learning algorithm.

The term "configured to" describes hardware, software or a combination of hardware and software that is adapted to, set up, arranged, built, composed, constructed, designed, or that has any combination of these characteristics to carry out a given function.

The term "coupled," as used herein, is defined as "connected," although not necessarily directly, and not necessarily mechanically.

The term "image" refers to a spatial pattern of physical light comprised of known colors of the light spectrum, which may or may not be visible to the human eye. The term image includes both real-world images, such as a live view through a camera, as well as a virtual representation of a space.

The term "image editing software" means software for editing and manipulating images, such as, Blender.org or Photoshop from Adobe.

The terms "including" and "having," as used herein, are defined as comprising (i.e., open language).

The term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The term "photogrammetry" is a technique to extract three-dimensional measurements of an object for obtaining reliable information, such as three-dimensional measurements, through processing and interpreting a series of photographic images. Photogrammetry may be complemented by techniques like LiDAR, laser scanners (using time of flight, triangulation or interferometry), white-light digitizers and any other technique that scans an area and returns x, y, z coordinates for multiple discrete points, commonly called "point clouds".

The term "roof ridge" is a line, that is typically where two roof planes or two roof segments meet.

The term "roof segment" is a physical portion or physical section of an overall roof that can be digitalized as a set of points lying in a common geometric plane or contiguous roof plane.

The term "roof segment contour" is a computed result from a computer vision model trained to identify a given roof segment. In contrast, a roof segment is the ground truth or 100% accurate physical portion of the roof. While a roof-segment contour is derived from the machine learning or computer vision model and may only be 95% accurate in identifying the entire roof segment. The percentage numbers here are purely conceptual for understanding the difference between reality and AI output results. They should not be used for any scientific quantitative considerations.

The term "roof segment edge" is the outer boundary of a roof segment that does not intersect with another roof segment.

The term "rooftop solar" is a system of photovoltaic or hot water solar panels that are mounted on the roof of a building.

It should be understood that the steps of the methods set forth herein are not necessarily required to be performed in the order described, and the order of the steps of such methods should be understood to be merely exemplary. Likewise, additional steps may be included in such methods, and certain steps may be omitted or combined in methods consistent with various embodiments of the present device.

Overview

The present invention provides a method and system for identifying shape-regularized roof segments for solar project design. The invention provides an automated process to find roof segments for rooftop solar project design. Using these automatically identified roof segments enables users to place panels using an algorithm to calculate solar panel layout. The invention automates identifying roof segments using an RGB (Red, Green, Blue) image, a Digital Surface Model (DSM) image, and a mask image of each roof. As further described below, the solution is composed of two steps:

Step 1: For a given roof, the solution feeds an RGB image into a Mask Region-based Convolutional Neural Network (Mask R-CNN) model to predict all the roof segment contours in the RGB image.

Step 2: The roof segment contours are then regularized into simpler shapes, such as polygons, that better fit the roof shape. The resulting polygons can be used for solar panel layout design. The analytical algorithm, or shape regularization module, identifies roof ridges and non-ridge edges using a Digital Surface Model (DSM) image and mask image of the roof for each roof segment.

Combining all the above steps, the module calculates a polygon and presents this fitting shape as the result of roof segment identification. This entire combined process above is automated. The simplified polygon provides much more convenience and scalability than any existing practices for the next step of panel placement calculation. The present invention includes manual adjustments due to the influence of vegetation.

To reach full automation, each segment of a targeted roof needs to be identified so that the system can understand which areas are available for solar panel array placement and optimization. The present invention provides a solution at identifying shape-regularized roof segments for solar project design.

The main improvements include:

- The present invention provides a method to automatically identify roof segments that is directly usable for rooftop solar project design.
- A custom machine learning or computer vision model is introduced to better locate roof segment areas. This largely improves the efficiency and scalability of finding roof segments in any roof image.
- A roof segment contour regularization method makes the contour usable in real-world rooftop solar project design with a simplified shape of the roof recognized.
- The regularization method is based on analytical algorithms. This reduces randomness in the whole process and, makes the solution more reliable in real-world business cases, and provides a better customer experience.
- The whole solution is based on a customized pre-trained model and analytical logic. This enables a fully automated design process and brings significant scalability.

Roof Images as Inputs

Each evaluation for rooftop solar installation requires two or three distinct aerial images. These aerial images may be captured using various techniques, including satellites and aircraft. The first image, as shown in FIG. 1 is an image 100 of a roof 102 being considered for rooftop solar installation. This image is typically a 2D image and in color, such as an RGB image. Note that there are two adjacent roofs 104 and 106 captured in image 100 as well. Unless otherwise noted, all the X and Y axes shown in the figures represent positions, typically pixel positions in an image.

Figure 2:
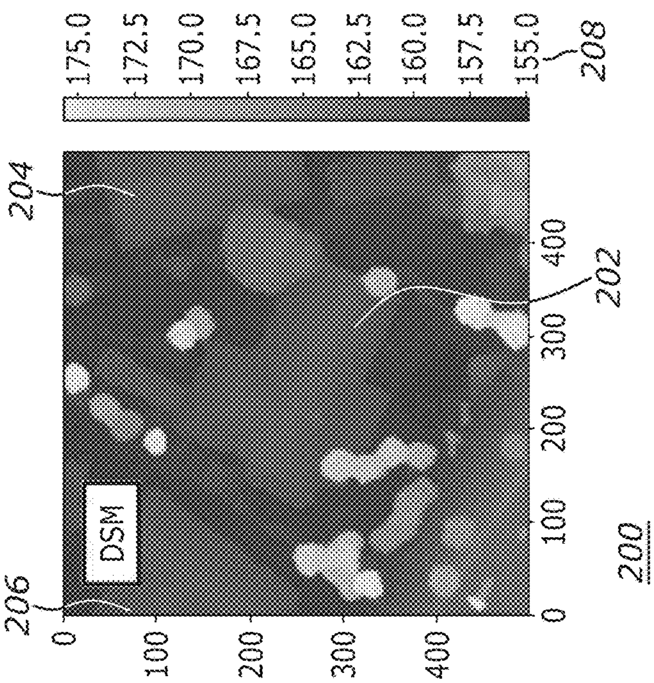
FIG. 2 illustrates a corresponding elevational image of the roof in FIG. 1, according to an example of the present invention.

The second distinct aerial image is illustrated in FIG. 2, which is the corresponding elevational image 200 of the roof 202, which is the same as roof 102 in FIG. 1. An example of an elevational image is a digital elevational model (DEM) or digital surface model (DSM). The DSM image contains elevation measurements associated with each pixel. In this example, the elevational view is depicted as is typical for a heatmap with a scale 208. Also shown in elevational image 200 are the corresponding elevational views of the adjacent roofs 204 and 206 captured as well.

Figure 3:
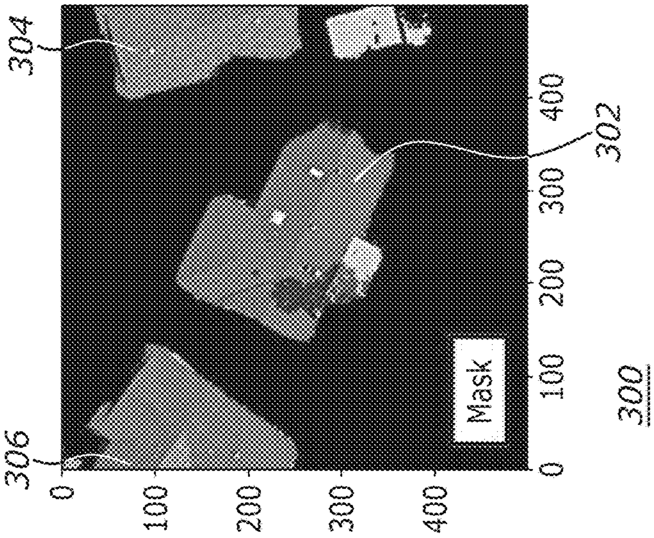
FIG. 3 illustrates a corresponding mask image of the roof in FIG. 1 and FIG. 2, according to an example of the present invention.

The third distinct aerial image is illustrated in FIG. 3, which is a corresponding mask image 300 of the roof 302, which is the same as roof 102 and 202 in FIG. 1 and FIG. 2, respectively. The mask image of FIG. 3 may be calculated using elevation images or the mask image may be provided by third parties, such as Google Project Sunroof. A mask image contains true/false binary information associated with each pixel in the RGB image, indicating whether the pixel is on any roof in the image or not. For example, the black areas are the pixels not on any roof and thus removed. Also shown in the mask image 300 are the corresponding mask views of the adjacent roofs 304 and 306 captured as well.

Terminology Use to Describe Portions of a Roof

Figure 4:
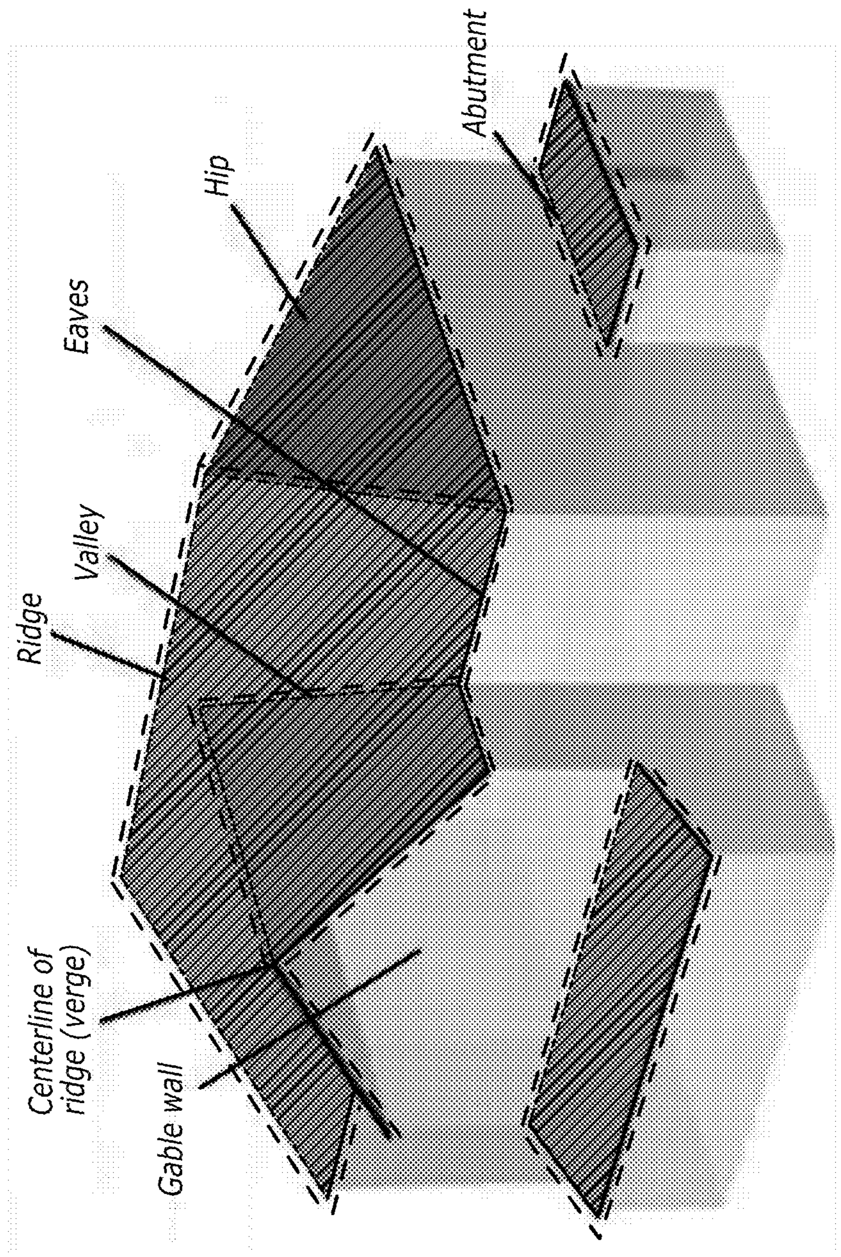
FIG. 4 is a perspective image of a house with various portions of the roof labeled, according to an example of the present invention.

FIG. 4 is a perspective image of a house with various portions of the roof labeled. The solid line style in the figure denotes the roof segment edge, i.e., boundaries between sections of the roof. The broken line style in the figure denotes the roof ridges. The labeled sections shown includes a gable wall, a centerline of ridge, a ridge, a valley, eaves, a hip, and an abutment. In this invention, the ‘ridges’ mentioned include centerlines of ridges, ridges, valleys, and abutments; the ‘edges’ mentioned include eaves and other outer boundaries of the roof.

High-Level Flow to Identify Roof Contours

Figure 5:
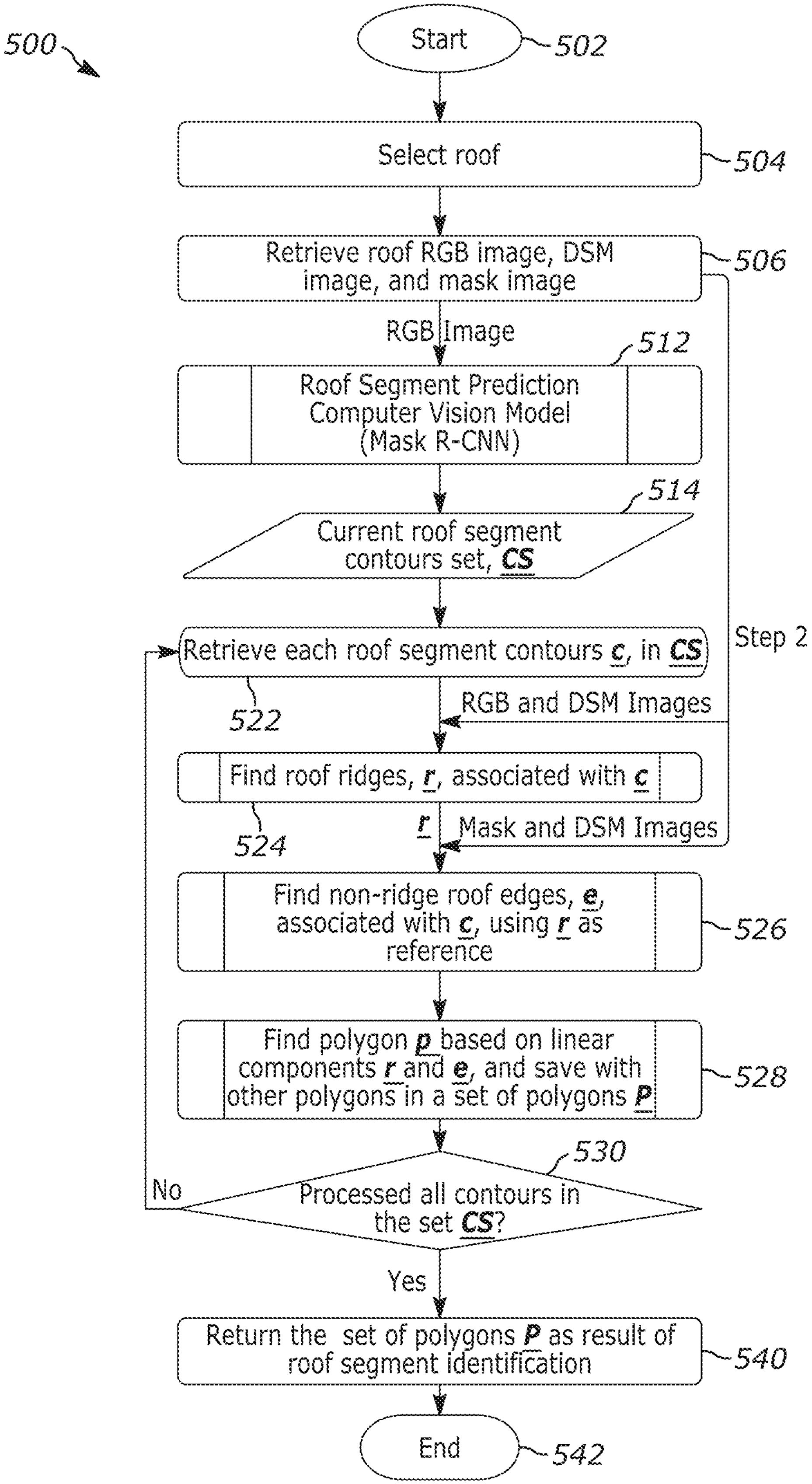
FIG. 5 is a high-level flow chart for identifying roof contours for a solar project design, according to an example of the present invention.

FIG. 5 is a high-level flow chart 500 for identifying roof contours for a solar project design. The process starts in step 502 and proceeds directly to step 504.

In Step 504, a roof is selected, such as the roof 102, 202, and 302 illustrated in three corresponding roof images 100, 200, and 300 shown in FIG. 1 through FIG. 3 described above. The roof images 100, 200, and 300 are retrieved in step 506, and the process continues to step 512.

Step 512 uses roof image 100 as input to a roof segment prediction machine learning or computer vision model, such as Mask R-CNN. An example of how to train the machine learning or computer vision model is described in FIG. 7 below. The Mask R-CNN outputs 514 a set of current roof segments CS. The process continues to steps 522 through 530 that are repeated for each roof segment contour c of the set of current roof segments CS.

In step 522, a respective roof segment contour c of the set of current roof segments CS is retrieved. In step 524, roof ridges r, associated with the respective roof segment contour c are found (i.e., determined) from the roof images 100 and 200. In step 526, the non-ridge roof edges e associated with the respective roof segment contour c, using roof ridge r as a reference, are found (i.e., determined) from the roof images 200 and 300. In step 528, polygons p are found (i.e., determined) based on linear components of the roof ridge r and the non-ridge roof edges e, and saved with other polygons in a set of polygons P. In decision 530, the process determines if all the roof segment contours c in the set CS have been processed. If there are more roof segment contours c to process, the process loops back to step 522, as shown. Otherwise, the process proceeds to step 540.

In step 540, the set of polygons P as a result of this process for roof segment identification is returned.

Figure 6:
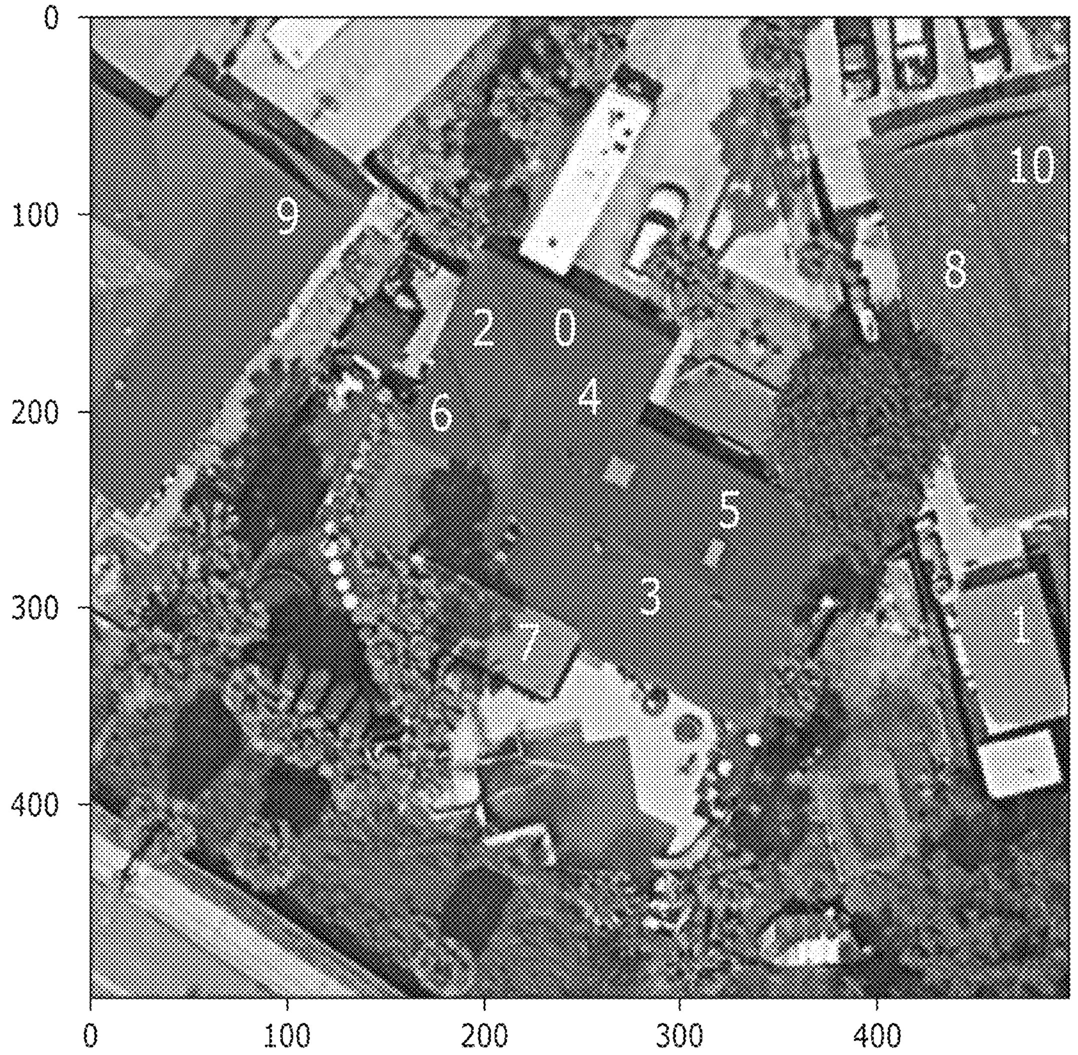
FIG. 6 illustrates an image that uses the images of FIGS. 1-3 to identify roof segments using the flow in FIG. 5, according to an example of the present invention.

FIG. 6 is an example of roof segment contours c identified from the flow in FIG. 5 using the images from FIGS. 1-3. The eleven roof segment contours are labeled for convenience from 0 through 10, as shown in FIG. 6.

High-Level Flow to Train a Machine Learning or Computer Vision Model

Figure 7:
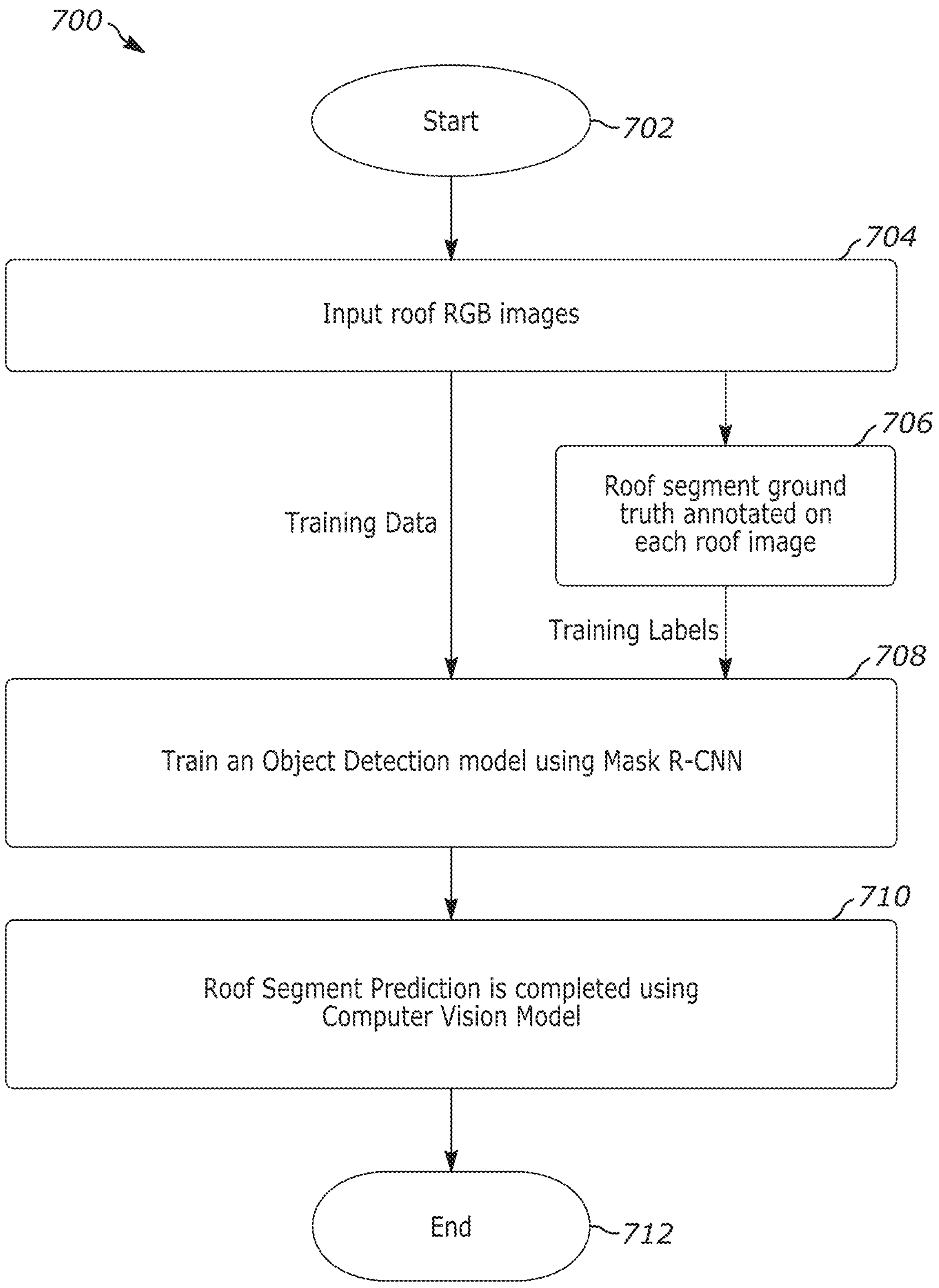
FIG. 7 is a high-level flow chart for training the prediction machine learning or computer vision model of FIG. 5, according to an example of the present invention.

FIG. 7 is a high-level flow chart 700 for training a prediction machine learning or computer vision model as used in step 512 of FIG. 5. The process begins at step 702 and immediately proceeds to step 704.

In step 704, the roof images, such as those from FIG. 1, are used as inputs, i.e., training data for training the prediction machine learning or computer vision model. Optionally, the one or more transformations are applied to each of the roof images including mirroring, rotating, smoothing, or contrast reduction to create a modified set of roof images. The process proceeds to both steps 706 and 708, as shown.

In step 706, roof segment images from a database of roof segment images, such as from Project Sunroof from Google or other database sources, are accessed and annotated with training labels, such as roof segment contours. The process continues to step 708.

In step 708, a machine learning model, such as Mask Region-based Convolutional Neural Networks (Mask R-CNN) can be trained using a computer vision model training platform, such as Detectron2, YOLOv5, MobileNet, Fastai, Keras, PyTorch, TensorFlow, and others. There are two input paths to step 708, one from step 704 and a second from 706. The process continues to step 710.

In step 710, the roof segment prediction is performed using the trained machine learning or computer vision model. The process ends in step 712.

As a non-limiting simplified example, starts with an untrained machine learning or computer vision model. In this example, the hyper-parameters for this new setup have five layers, each with ten neurons. A hundred roof images are in the training set. The hundred roof images are shuffled and split into multiple even-sized sub-sets using a settable number of sub-sets. In this example, the settable number of sub-sets is five. There are five sub-sets of training images, which are sub-sets A, B, C, D, and E, respectively. The first four sub-sets (A, B, C, and D), totaling eighty images, are used to train a new machine learning or computer vision model. Next, the sub-set E with twenty images is applied to the model previously trained with eighty images of the first four sub-sets. The accuracy of applying the twenty images to the trained model is measured. An example of the measured accuracy is 80 percent.

Next, to generalize the trained model, the process repeats as a multiple-fold cross-validation to find the averaged general model performance metrics. The training is run again on sub-sets B, C, D, and E using the same number of layers and neurons in each layer. The sub-set A images are used to test the trained model and to reach accuracy. This process is repeated three more times with sub-sets B, C, and D as testing data, respectively and capture the accuracies of these three experiments. The average of the five accuracies is used as the general performance corresponding to the current set of hyper-parameters. This is the five-fold cross validation process.

In order to further tune the generalized trained model, additional settings may be used. In this example, the setting could be three layers and each layer has twenty neurons. The process is repeated for each combination of additional settings. The hyper-parameter setting corresponding to the best average performance are used as the optimal setting.

The optimal hyper-parameter setting is used to train a finalized model based on all one hundred images in the training data set.

High-Level Flow to Find Roof Ridges Associated with Roof Segment

Figure 8:
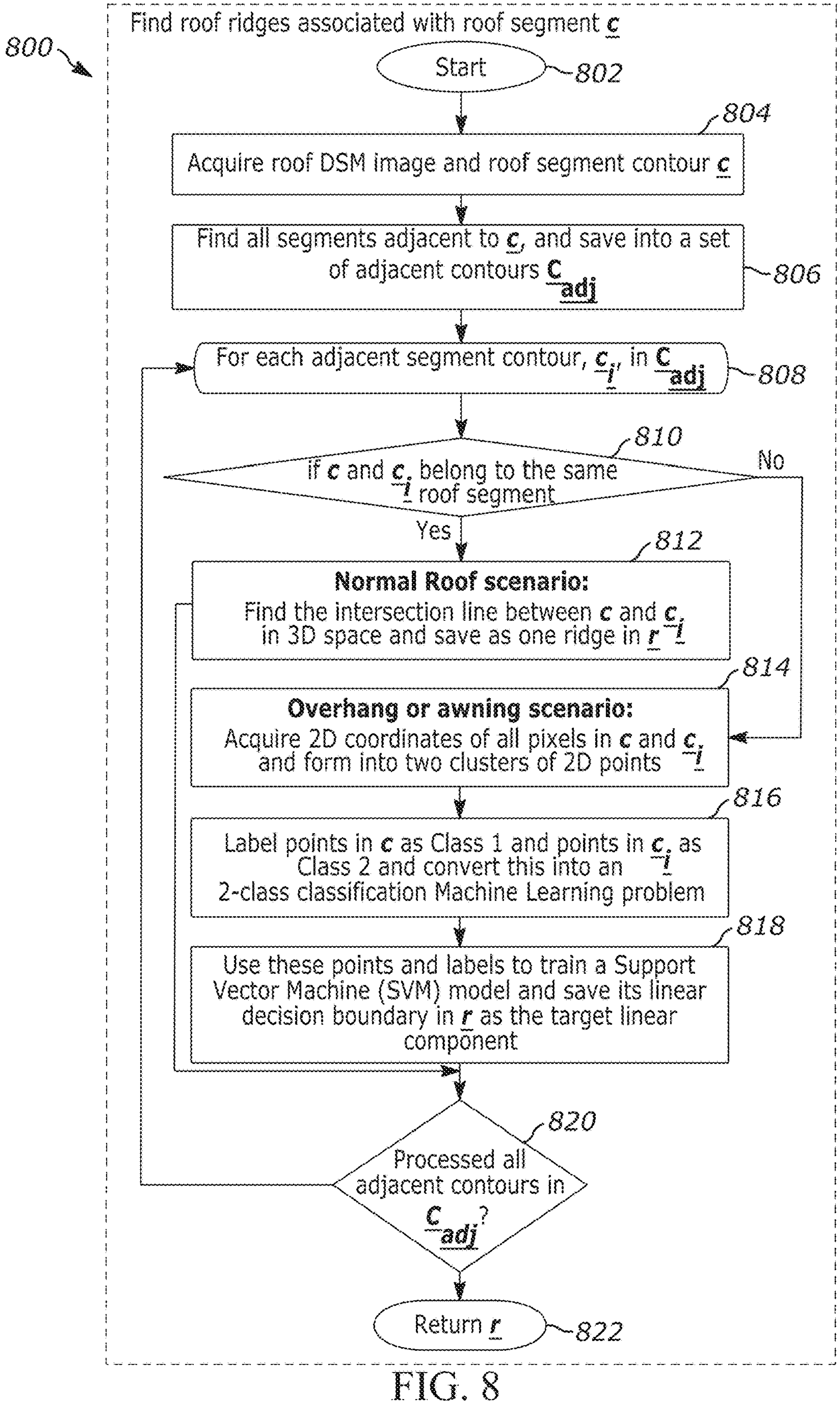
FIG. 8 is a high-level flow chart for identifying roof ridges associated with roof contours in FIG. 5, according to an example of the present invention.

FIG. 8 is a high-level flow chart 800 for identifying roof ridges r associated roof contours c as shown in in FIG. 5. The process starts in step 802 and immediately proceeds to step 804.

In step 804, the DSM image, such as that from FIG. 2, is used with the roof segment contour c in the roof segment contour set in step 514 of FIG. 5. The process continues to step 806.

In step 806, all segments that are adjacent to contour c are identified based on relative distance of corresponding pixel coordinates and saved into an adjacent set of adjacent contours $C_{adj}$. The process continues to step 808, which begins a loop.

The beginning of a loop in step 808 starts with looking at each adjacent contour $c_i$ in the set of adjacent contours $C_{adj}$. The process continues to a first decision in step 810.

In step 810, the first decision is to test whether the contour c and adjacent contour $c_i$ belong to the same roof segment. In the case that the contour c and adjacent contour $c_i$ belong to the same roof segment, the process continues to step 812.

In step 812, a normal roof scenario is processed. A normal roof scenario is a roof without an overhang or an awning. During processing of the normal roof scenario, the intersection line between the contour c and the adjacent contour $c_i$ is located and saved as one ridge r. More specifically, roof ridges associated with the roof segment contour c are identified in one example through a series of sub-steps. The first sub-step is to find a set of roof segments adjacent $C_{adj}$ to the roof segment contour c. Next, a loop is entered for automatically performing an intersection calculation process wherein for each adjacent segment contour $c_i$ in the set of roof segments adjacent $C_{adj}$, by i) determining if the roof segment contour c and each adjacent roof segment contour $c_i$ belong to an identical selected roof; ii) in response to the roof segment contour c and each adjacent roof segment contour $c_i$ belong to an identical selected roof, using elevation data from the elevational image of the selected roof and pixel XY coordinates to build two 3D plane models for c and $c_i$, respectively; iii) calculating an intersection line between the two 3D plane models; iv) projecting the intersection line in 3D space to 2D space using the pixel XY coordinates to produce a resulted 2D line; and v) adding the resulted 2D line to ridges set r. The process continues to step 820.

Otherwise, if step 810 results in "No", the process continues to step 814. In step 814, an overhang or awning scenario, 2D coordinates of all pixels in contour c and adjacent contour $c_i$ are divided into two clusters of 2D points. The process continues to step 816.

In step 816, the 2D points in contour c is in class 1 and adjacent contour $c_i$ are class 2. This is converted into a 2-class classification machine learning problem. The process continues to step 818.

In step 818, the points from step 816 are used as class labels to train a support vector machine (SVM) model and save its linear decision boundary as ridge r as the target linear component. This target linear component is one of the roof ridges associated with the roof segment. The process continues to a second decision, step 820.

In step 820, the second decision step is to test if all adjacent counters in $C_{adj}$ have been processed. If further adjacent contours are available to process, the process loops back to step 808, as shown. Otherwise, the process ends in step 822 and returns the roof ridges r.

Example of Identified Roof Ridges Associated with Roof Segments

Figure 9:
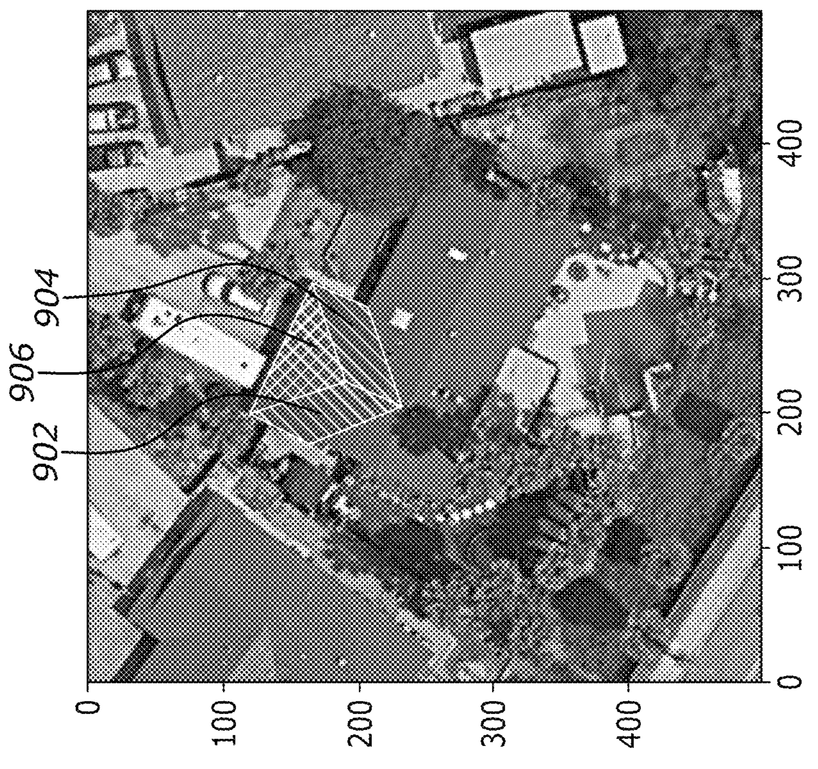
FIG. 9 illustrates a corresponding image of FIG. 5 with roof contours adjacent to ridges identified using the flow in FIG. 8, according to an example of the present invention.
Figure 10:
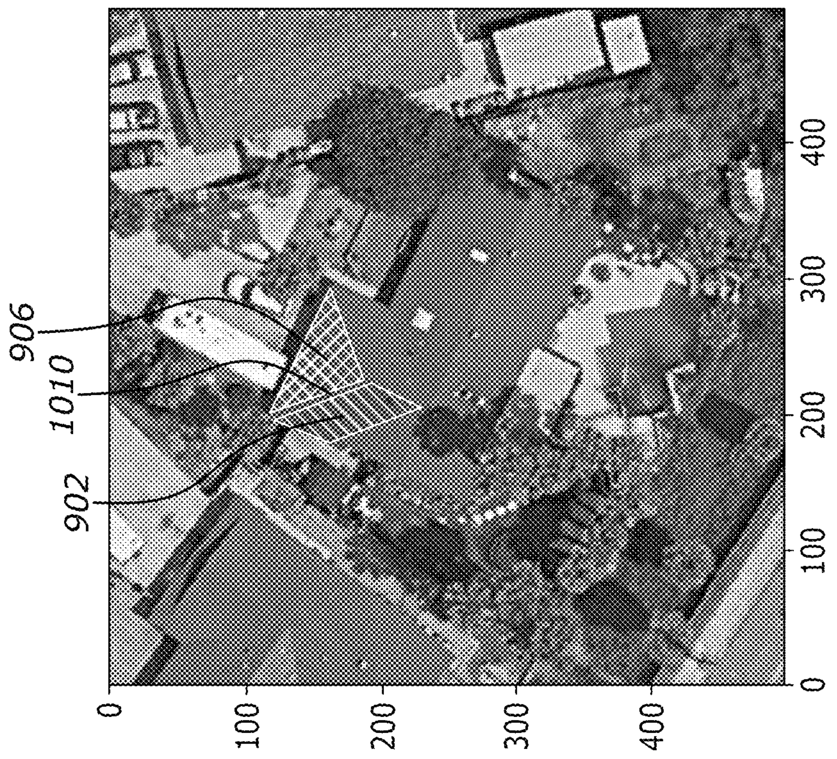
FIG. 10 illustrates a corresponding image of FIG. 5 with the roof ridges identified using the flow in FIG. 8, according to an example of the present invention.

FIG. 9 illustrates a corresponding image of FIG. 5 with the roof segments associated with roof ridges identified using the flow in FIG. 8. Three roof segments 902, 904, and 906 are identified in this example. Continuing further, FIG. 10 illustrates a corresponding image of FIG. 5 with the roof ridge 1010 identified using the flow in FIG. 8.

Figure 11:
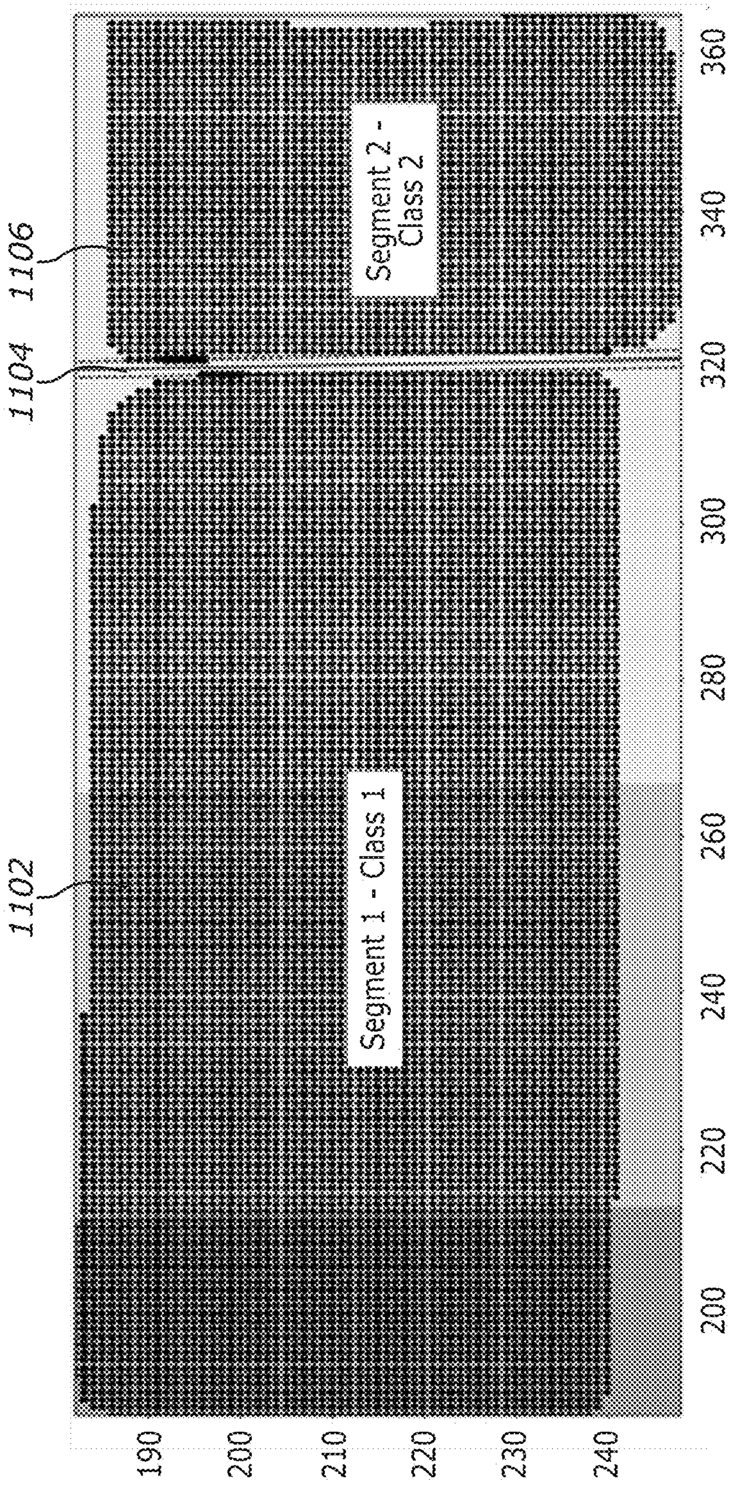
FIG. 11 illustrates an image of another house roof with two classes of clusters for two roof segment contours using the flow in FIG. 8, according to an example of the present invention.

FIG. 11 illustrates an image of another house roof with two classes of clusters for two roof segment contours with a roof edge between them. The first cluster is a roof segment contour 1102, and a second cluster is roof segment contour 1106. This is an overhang or awning detection, the roof edge is 1104. These two classes are identified using the flow in FIG. 8.

Figure 12:
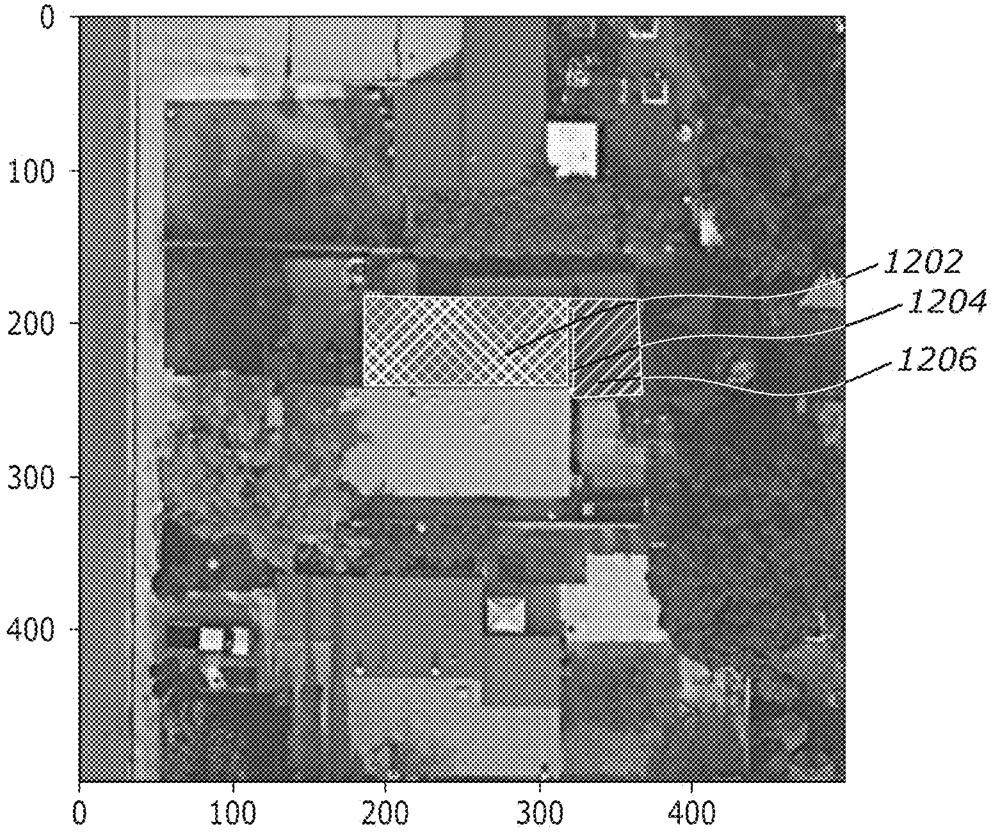
FIG. 12 illustrates an image of the house roof of FIG. 11 with overhang or awning identified, according to an example of the present invention.

FIG. 12 illustrates an image of the house roof of FIG. 11 with an overhang or awning identified 1206, the roof edge 1204, and the roof segment 1202 as shown.

High-Level Flow to Find Roof Edges Associated with Roof Segment

Figure 13:
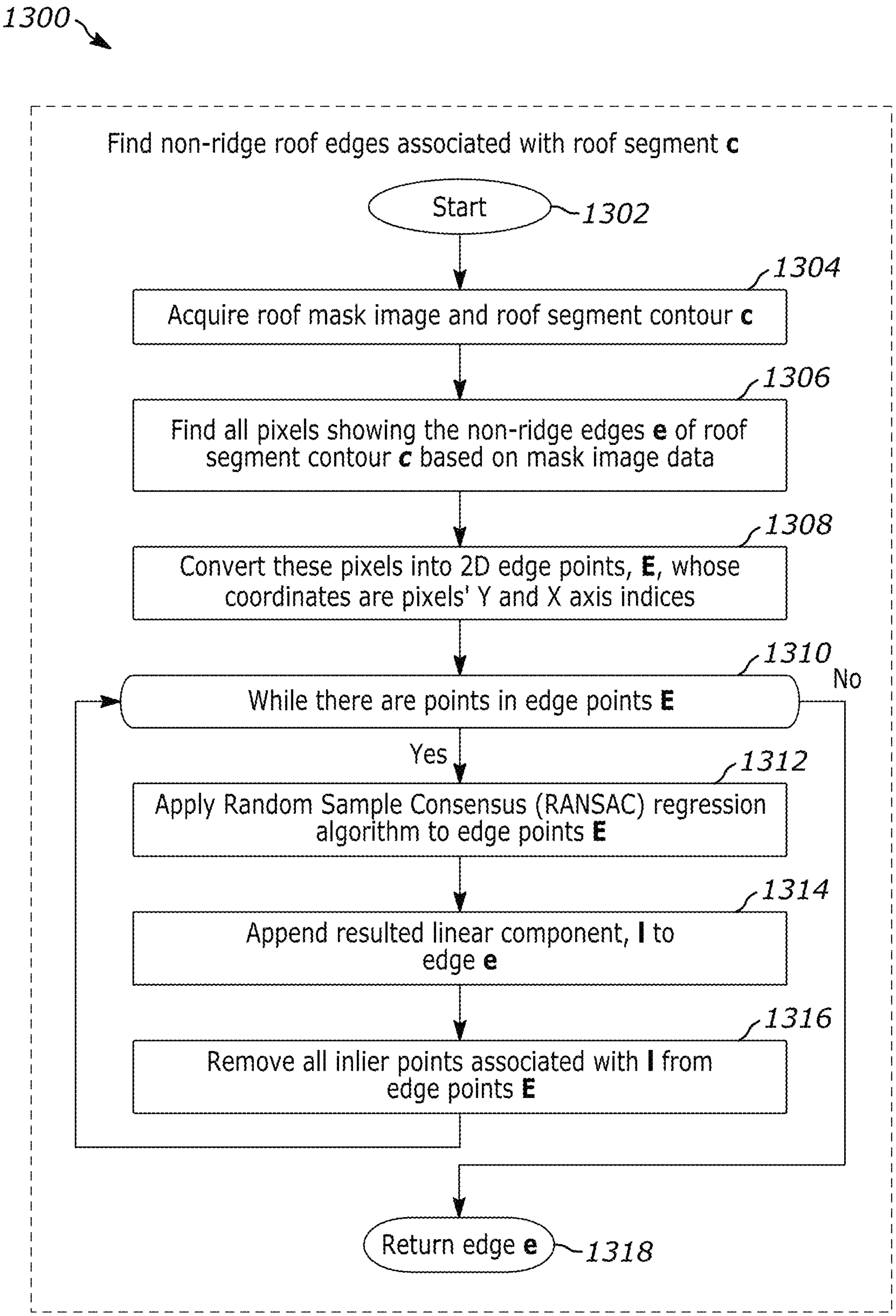
FIG. 13 is a high-level flow chart for identifying non-ridge edges of a roof segment, according to an example of the present invention.

FIG. 13 is a high-level flow chart 1300 for identifying non-ridge edges of a roof segment contour c, as done in step 526 of FIG. 5. The process begins at step 1302 and immediately proceeds to step 1304.

In step 1304, a roof mask image, such as from FIG. 3 and roof segment contour c, such as from FIG. 5 are acquired. The process continues to step 1306.

In step 1306, all pixels showing the non-ridge edges of roof segment contour c are found (i.e., identified) based on mask image data from the roof mask image. The process continues to step 1308.

In step 1308, the pixels found in step 1306 are converted into 2D edge points E, whose coordinates are pixels on X and Y axes, such as in FIG. 11. The process continues to step 1310.

In step 1310, a loop is entered, while there are edge points in E, steps 1312 through 1316 are performed as shown. The first step in the loop, step 1312, applies a random sample consensus (RANSAC) regression algorithm to edge points E resulting in resultant liner component I. Next, in step 1314, the resultant liner component I is appended to non-ridge roof edge e from step 526 of FIG. 5. At this point, there are both outlier and inlier points associated with linear component I from edge points E. Finally, in step 1316, all the inlier points associated with linear component I from edge points E are removed. The process repeats through step 1310 to step 1316 while there are points in edge points E. Once all the points in edge points E are processed, the process continues to a final step 1318 in which the roof edge e is returned.

Figure 14:
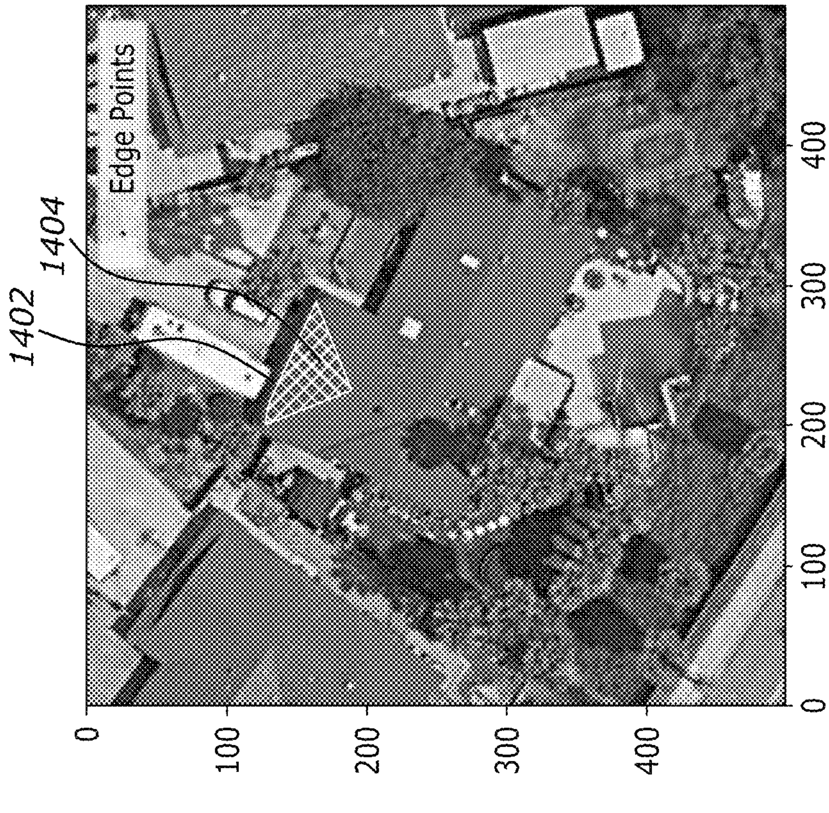
FIG. 14 illustrates a corresponding image of FIG. 10 with the non-ridge edge points identified using the flow in FIG. 13, according to an example of the present invention.

FIG. 14 illustrates a corresponding image of FIG. 10 with the non-ridge edge points as part of roof segment 1402 identified using the flow in FIG. 13.

Figure 15:
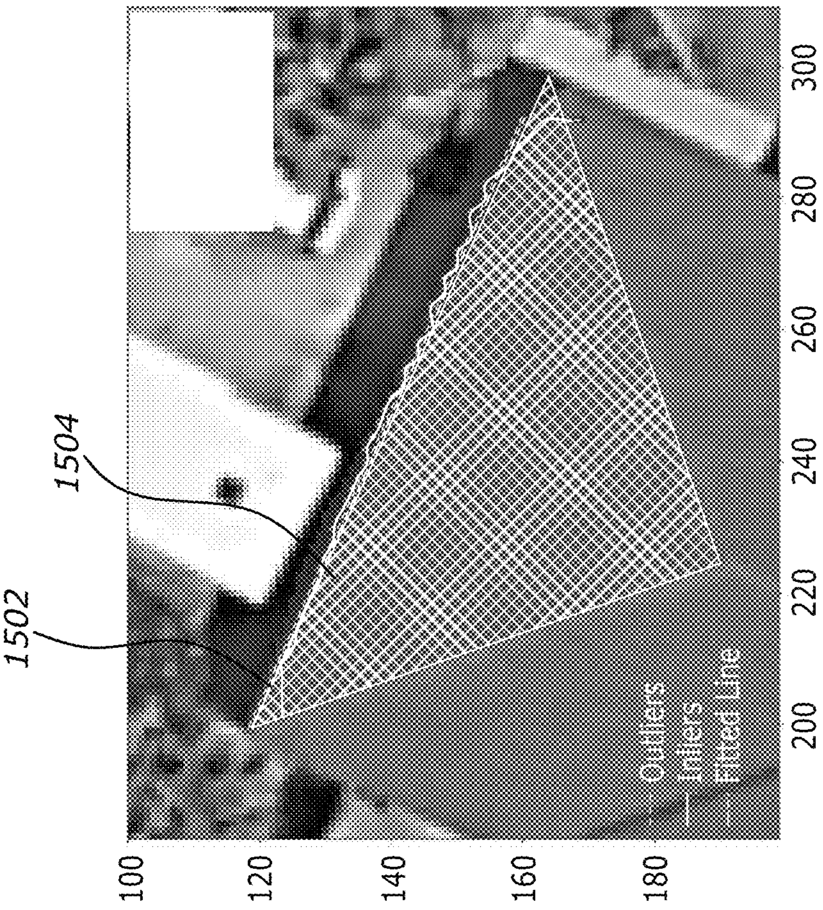
FIG. 15 illustrates a corresponding image of FIG. 10 with the non-ridge edge outliers, inliers and a fitted line identified using the flow in FIG. 13, according to an example of the present invention.
Figure 16:
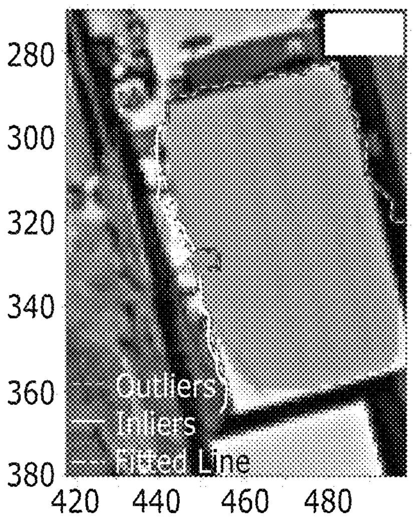
FIG. 16 to FIG. 19 illustrates the details of roof segment labeled "1" of FIG. 6 with the non-ridge edge outliers, inliers and a fitted line identified using the flow in FIG. 13, according to an example of the present invention.
Figure 17:
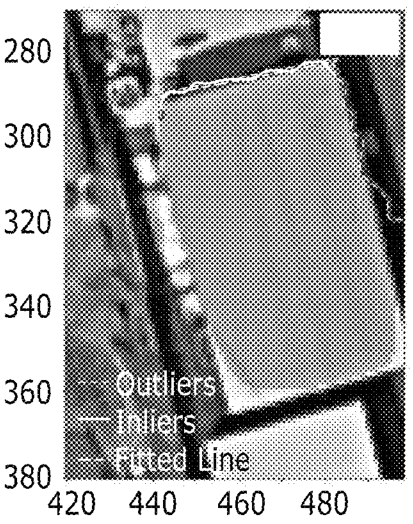
Figure 18:
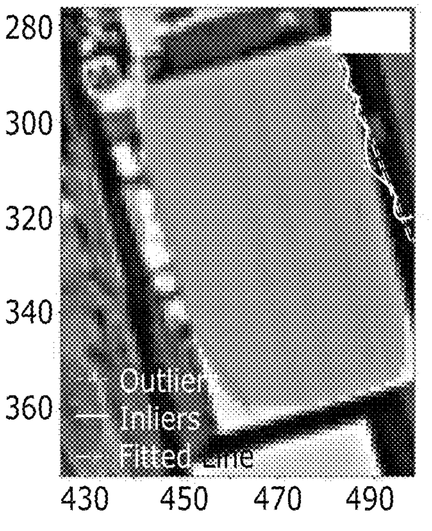
Figure 19:
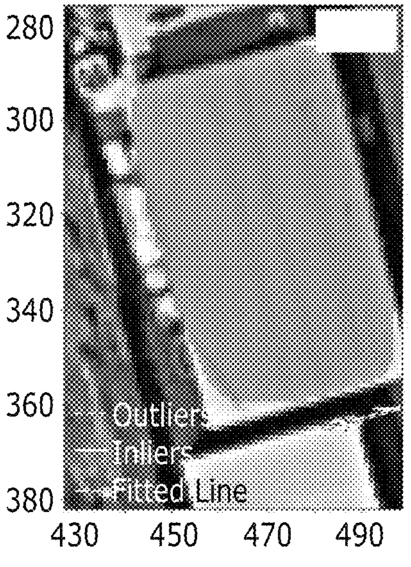

FIG. 15 illustrates a corresponding image of FIG. 10 with the non-ridge edge outliers, inliers, and a fitted line 1502 identified as part of roof segment 1502 using the flow in FIG. 13.

FIG. 16 to FIG. 19 illustrate the details of roof segment contour labeled "1" of FIG. 6 with the non-ridge edge outliers, inliers, and a fitted line identified using the flow in FIG. 13. These four images show an example where multiple edges are identified using the iterative process in FIG. 13, while the example in FIG. 14 and FIG. 15 illustrates that a single edge is identified. The annotation of the outliers, inliers, and fitted lines are using the same line styles as in FIG. 14 and FIG. 15.

Figure 20:
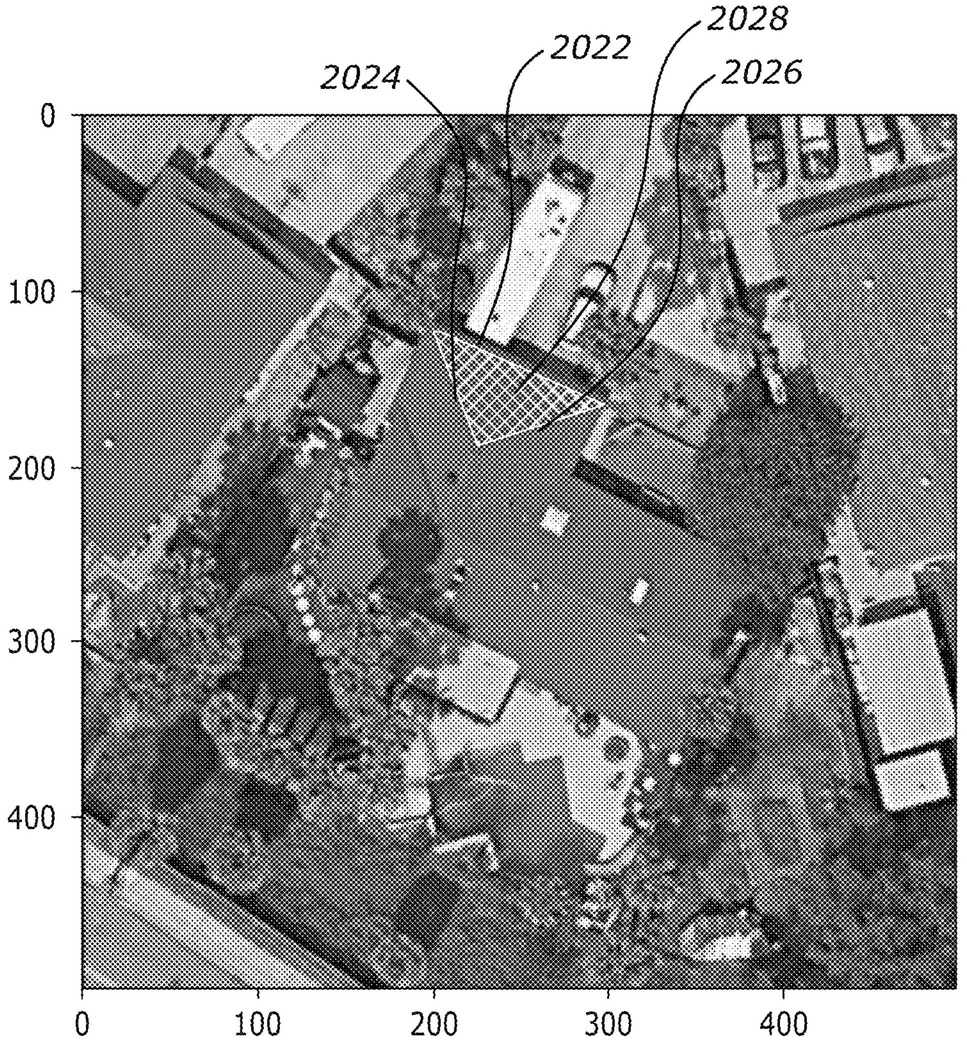
FIG. 20 illustrates the details of FIG. 10 with the roof ridges combined with non-ridge edge outliers, inliers and a fitted line, according to an example of the present invention.

FIG. 20 illustrates the details of roof segment 2028 of FIG. 10 with the roof ridges 2024, 2026, combined with the non-ridge edge 2022.

Electronic Device

Figure 21:
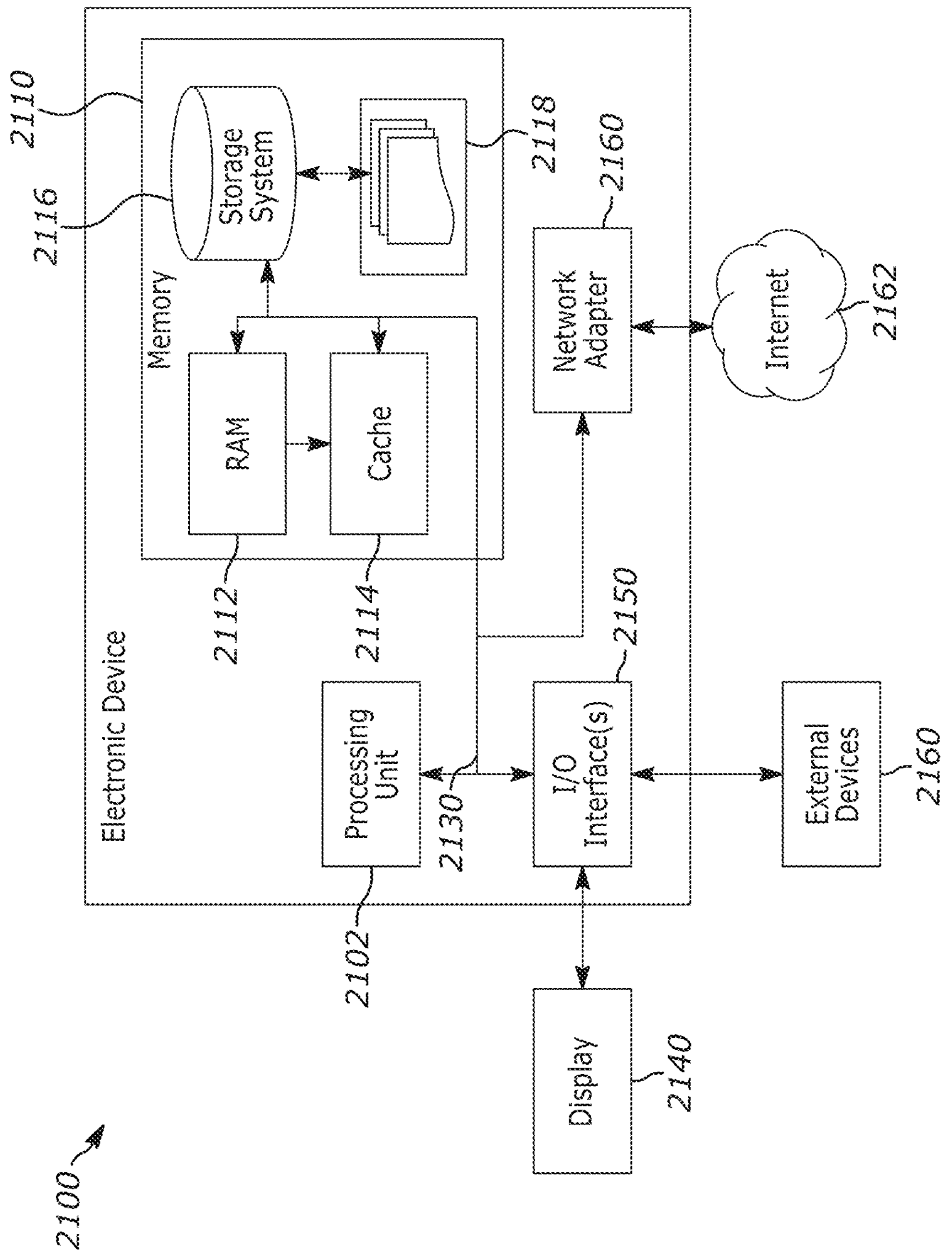
FIG. 21 illustrates a block diagram illustrating a processor for carrying out the flow charts and presenting the images of FIG. 1 through FIG. 20, according to an example of the present invention.

FIG. 21 is a block diagram of an example of an electronic device 2100, such as a computer, including laptop computer or other portable device, such as a smartphone, that may run the software to carry out the flow and presenting the images of seen in respective figures above. The electronic device 2100 may incorporate communication a network adapter 2160 to communicate using a wired or wireless connection to the Internet 2162.

The electronic device 2100 includes a processing unit 2102 that controls the overall operation of the electronic device 2100. The processing unit 2102 interacts with the above-described network adapter 2160 and also interacts with other device subsystems such as random access memory (RAM) 2112, cache 2114, system storage 2116, and programs 2118. The processing unit 2102 further interacts input/output (I/O) interface(s) 2150, display 2140 and or any other external devices 2160.

Operating system software used by the processor 2102 is stored in system storage 2116. Further examples are able to use a battery backed-up RAM or other non-volatile storage data elements to store operating systems, other executable programs, or both. The operating system software, device application software, or parts thereof, are able to be temporarily loaded into volatile data storage such as RAM 2112.

The processing unit 2102, in addition to its operating system functions, is able to execute software applications 2118 on the electronic device 2100. A predetermined set of applications that control basic device operations.

Further applications may also be loaded onto the electronic device 2100 through, for example, the network adapter 2160. Such applications are then able to be installed by a user in the RAM 2112 or system storage 2116 for execution by the processor 2102.

External devices 2160 may be a media reader which is able to be connected to the I/O interface(s) 2150 to allow, for example, loading computer readable program code of a computer program product into the electronic device 2100 for storage into non-volatile memory such as storage system 2116. One example of an external devices 2160 is an optical drive such as a CD/DVD drive, which may be used to store data to and read data from a computer readable medium. Examples of suitable computer readable storage media include optical storage media such as a CD or DVD, magnetic media, USB, or any other suitable data storage device.

Non-Limiting Examples

Although specific examples of the subject matter have been disclosed, those having ordinary skill in the art will understand that changes can be made to the specific examples without departing from the spirit and scope of the disclosed subject matter. The scope of the disclosure is not to be restricted, therefore, to the specific examples, and it is intended that the appended claims cover any and all such applications, modifications, and examples within the scope of the present disclosure.

What is claimed is:

1. A computer-implemented method to identify roof segments for a rooftop solar installation, the method comprising:

- accessing an image of a roof, an elevational image of the roof, and a mask image of the roof, the mask image indicates whether a coordinate point in the image denotes a portion of the roof;
- applying the mask image to the elevational image of the roof to create a set of coordinate points that denote the portion of the roof;
- automatically creating a set of roof segment contours, using a machine learning model, for each roof segment in the set of coordinate points that denote the portion of the roof;
- for each roof segment contour in the set of roof segment contours, automatically
  - identifying roof ridges associated with the roof segment contour,
  - using the roof ridges as a reference, identifying non-roof edges associated with the roof segment contour, and
  - matching and associating a polygon shape to each roof segment, based on the roof ridges and the non-roof edges identified; and
- automatically overlaying, in a graphical user interface, each polygon shape on the respective associated roof segment in the image of the roof.

2. The computer-implemented method of claim 1, further comprising:

- creating the machine learning model by:
  - accessing a set of roof images;
  - applying one or more transformations to each roof image including mirroring, rotating, smoothing, or contrast reduction to create a modified set of roof images;
  - splitting the modified set of roof images by a settable ratio into training sub-sets and testing sub-sets; and
  - repeating for a plurality of user-settable iterations, each of:
    - conducting multiple-fold cross-validation to find an average general model performance metrics; and
    - tuning hyperparameter settings of the machine learning model to produce a set of accuracy measurements;
- identifying optimal hyperparameter settings for a machine learning model using the average general model performance metrics; and
- training the machine learning model using the optimal hyperparameter settings and the modified set of roof images as a training dataset.

3. The computer-implemented method of claim 1, wherein the identifying roof ridges associated with the roof segment contour, further comprises:

- finding a set of roof segments adjacent to the roof segment contour;
- iteratively performing, for each adjacent segment contour in the set of roof segments adjacent, an intersection calculation process by:
  - determining if the roof segment contour and each adjacent roof segment contour belong to an identical selected roof;
  - in response to the roof segment contour and each adjacent roof segment contour belonging to an identical selected roof, using elevation data from the elevational image of the selected roof and pixel XY coordinates to build two 3D plane models for the roof segment contour and the adjacent segment contour, respectively;
  - calculating an intersection line between the two 3D plane models;
  - projecting the intersection line in 3D space to 2D space using the pixel XY coordinates to produce a resulted 2D line, in which the resulted 2D line is associated with a roof ridge;
  - adding the resulted 2D line to a set of roof ridges; and
  - selecting another adjacent segment contour in the set of roof segments adjacent.

4. The computer-implemented method of claim 3, wherein in response to the roof segment contour and each adjacent roof segment contour not belonging to an identical selected roof, automatically

- acquiring a set of 2D coordinate points of all coordinate points on the roof segment contour and the adjacent segment contour;
- labeling the 2D coordinate points in the roof segment contour as a first class;
- labeling the 2D coordinate points in the adjacent segment contour as a second class;

converting the first class and the second class into a two-class classification machine learning problem with the set of 2D coordinates points;

training a support vector machine (SVM) model using the set of 2D coordinate points, the first class, and the second class; and saving a resulting linear decision boundary as one of the roof ridges associated with the roof segment.

5. The computer-implemented method of claim 1, wherein the identifying non-roof edges associated with the roof segment contour, further comprises:

accessing the mask image and the roof segment contour;

identifying all non-ridge coordinate points showing the non-roof edges of the roof segment contour based on the mask image;

converting the non-ridge coordinate points into a set of 2D edge points; and for the set of 2D edge points, iteratively performing, until there is no 2D edge point left in the set of 2D edge points, each of:

applying a random sample consensus (RANSAC) regression algorithm to a current set of 2D edge points, appending a resulting linear component to the non-roof edges, where the resulting linear component is a line found in this iteration indicating edges found, and removing all inlier points associates with the resulting linear component resulting linear component from the current set of 2D edge points.

6. The computer-implemented method of claim 1, wherein the automatically overlaying, in the graphical user interface, the set of polygon shapes on the respective associated roof segment in the image of the roof, further includes overlaying each polygon shape with a different color.

7. The computer-implemented method of claim 1, wherein the automatically overlaying, in the graphical user interface, the set polygon shapes on the respective associated roof segment in the image of the roof, further includes overlaying each non-ridge edge outlier, inlier, and a fitted line derived from the intersection of the 3D space to the 2D space, with a different color.

8. The computer-implemented method of claim 1, wherein the image of the roof is one of a gray scale image or a color image, the elevational image of the roof is a digital surface model (DSM) image, and the mask image of the roof is previously created or created based on the image of the roof and the elevational image.

9. A computer-implemented method to identify roof ridges associated with roof segments for a rooftop solar installation that include one of an overhang, an awning, or both, the method comprising:

accessing an image of a roof, an elevational image of a selected roof that corresponds to the image of the roof, and a corresponding mask image, the mask image indicates whether a coordinate point in the image of the roof denotes a portion of the selected roof;

applying the mask image to the image of the selected roof to create a set of coordinate points that denote the portion of the selected roof;

automatically creating a set of roof segment contours, using a computer vision model, for each roof segment in the set of coordinate points that denote the portion of the selected roof;

for each roof segment contour in the set of roof segment contours, automatically performing each of:

identifying roof ridges associated with the roof segment contour by:

finding a set of roof segments adjacent to the roof segment contour;

for each adjacent segment contour in the set of roof segments adjacent, automatically performing:

in response to the roof segment contour and the adjacent roof segment contour not belonging to an identical selected roof, acquiring a set of 2D coordinates of all coordinate points of the roof segment contour and the adjacent segment contour by:

labeling the 2D coordinate points in the roof segment contour as a first class;

labeling the 2D coordinate points in the adjacent segment contour as a second class;

converting the first class and the second class into a two-class classification machine learning problem with the set of 2D coordinates points;

training a support vector machine (SVM) model using the set of 2D coordinate points, the first class, and the second class;

saving a resulting linear decision boundary as a one of the roof ridges associated with the roof segment;

using the roof ridges as a reference, finding all the edge coordinate points from the mask image that contain information about coordinate points on roof or not, conducting Random Sample Consensus (RANSAC) regression to these edges points, finding all linear components from them, and identifying these linear components as non-roof edges associated with the roof segment contour, matching a polygon shape to each roof segment, based on the roof ridges and the non-roof edges identified; and automatically overlaying, in a graphical user interface, each polygon shape associated with each roof segment in the image of the selected roof.

10. A system to identify roof segments for a rooftop solar installation, the system comprising:

a computer memory capable of storing machine instructions; and a hardware processor in communication with the computer memory, the hardware processor configured to access the computer memory to execute the machine instructions for performing:

accessing an image of a roof, an elevational image of the roof, and a mask image of the roof, the mask image indicates whether a coordinate point in the image denotes a portion of the roof;

applying the mask image to the elevational image of the roof to create a set of coordinate points that denote the portion of the roof;

automatically creating a set of roof segment contours, using a machine learning model, for each roof segment in the set of coordinate points that denote the portion of the roof;

for each roof segment contour in the set of roof segment contours, automatically identifying roof ridges associated with the roof segment contour, using the roof ridges as a reference, identifying non-roof edges associated with the roof segment contour, and matching and associating a polygon shape to each roof segment, based on the roof ridges and the non-roof edges identified; and automatically overlaying, in a graphical user interface, each polygon shape on the respective associated roof segment in the image of the roof.

11. The system of claim 10, further comprising:

creating the machine learning model by:

accessing a set of roof images;

applying one or more transformations to each roof image including mirroring, rotating, smoothing, or contrast reduction to create a modified set of roof images;

splitting the modified set of roof images by a settable ratio into training sub-sets and testing sub-sets; and repeating for a plurality of user-settable iterations, each of:

conducting multiple-fold cross-validation to find an average general model performance metrics; and tuning hyperparameter settings of a machine learning model to produce a set of accuracy measurements;

identifying optimal hyperparameter settings for a machine learning model using the average general model performance metrics; and training the machine learning model using the optimal hyperparameter settings and the modified set of roof images as a training dataset.

12. The system of claim 10, wherein the identifying roof ridges associated with the roof segment contour, further comprises:

finding a set of roof segments adjacent to the roof segment contour;

iteratively performing, for each adjacent segment contour in the set of roof segments adjacent, an intersection calculation process by:

determining if the roof segment contour and each adjacent roof segment contour belong to an identical selected roof;

in response to the roof segment contour and each adjacent roof segment contour belonging to an identical selected roof, using elevation data from the elevational image of the selected roof and pixel XY coordinates to build two 3D plane models for the roof segment contour and the adjacent segment contour, respectively;

calculating an intersection line between the two 3D plane models;

projecting the intersection line in 3D space to 2D space using the pixel XY coordinates to produce a resulted 2D line, in which the resulted 2D line is associated with a roof ridge;

adding the resulted 2D line to a set of roof ridges; and selecting another adjacent segment contour in the set of roof segments adjacent.

13. The system of claim 12, wherein in response to the roof segment contour and each adjacent roof segment contour not belonging to an identical selected roof, automatically acquiring a set of 2D coordinate points of all coordinate points on the roof segment contour and the adjacent segment contour;

labeling the 2D coordinate points in the roof segment contour as a first class;

labeling the 2D coordinate points in the adjacent segment contour as a second class;

converting the first class and the second class into a two-class classification machine learning problem with the set of 2D coordinates points;

training a support vector machine (SVM) model using the set of 2D coordinate points, the first class, and the second class; and saving a resulting linear decision boundary as one of the roof ridges associated with the roof segment.

14. The system of claim 10, wherein the identifying non-roof edges associated with the roof segment contour, further comprises:

accessing the mask image and the roof segment contour;

identifying all non-ridge coordinate points showing the non-roof edges of the roof segment contour based on the mask image;

converting the non-ridge coordinate points into a set of 2D edge points; and for the set of 2D edge points, iteratively performing, until there is no 2D edge point left in the set of 2D edge points, each of:

applying a random sample consensus (RANSAC) regression algorithm to a current set of 2D edge points, appending a resulting linear component to the non-roof edges, where the resulting linear component is a line found in this iteration indicating the edges found, and removing all inlier points associates with the resulting linear component resulting linear component from the current set of 2D edge points.

15. The system of claim 10, wherein the automatically overlaying, in the graphical user interface, the set of polygon shapes on the respective associated roof segment in the image of the roof, further includes overlaying each polygon shape with a different color.

16. The system of claim 10, wherein the automatically overlaying, in the graphical user interface, the set polygon shapes on the respective associated roof segment in the image of the roof, further includes overlaying each non-ridge edge outlier, inlier, and a fitted line derived from the intersection of the 3D space to the 2D space, with a different color.

17. The system of claim 10, wherein the image of the roof is one of a gray scale image or a color image, the elevational image of the roof is a digital surface model (DSM) image, and the mask image of the roof is previously created or created based on the image of the roof and the elevational image.

* * * * *